United States Patent
King et al.

(10) Patent No.: US 12,463,477 B2
(45) Date of Patent: Nov. 4, 2025

(54) LIGHTWEIGHT ROTOR DESIGN WITH COMPOSITE STRUCTURE

(71) Applicant: Hamilton Sundstrand Corporation, Charlotte, NC (US)

(72) Inventors: Jeffrey P. King, Coventry, CT (US); Zaffir A. Chaudhry, South Glastonbury, CT (US); Andrzej E. Kuczek, Bristol, CT (US); Wenping Zhao, Glastonbury, CT (US); Huan Zhang, Glastonbury, CT (US); Jagadeesh K. Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 274 days.

(21) Appl. No.: 18/330,412

(22) Filed: Jun. 7, 2023

(65) Prior Publication Data
US 2024/0413680 A1 Dec. 12, 2024

(51) Int. Cl.
- *H02K 1/274* (2022.01)
- *H02K 1/02* (2006.01)
- *H02K 15/03* (2025.01)

(52) U.S. Cl.
CPC .............. *H02K 1/274* (2013.01); *H02K 1/02* (2013.01); *H02K 15/03* (2013.01)

(58) Field of Classification Search
CPC ............ H02K 1/02; H02K 1/27; H02K 1/274; H02K 15/03; H02K 1/272; H02K 15/035; H02K 1/06; H02K 1/22; H02K 1/30; H02K 1/32
See application file for complete search history.

(56) References Cited

U.S. PATENT DOCUMENTS

| | | | |
|---|---|---|---|
| 3,271,607 A | 9/1966 | Slotnick et al. | |
| 5,296,773 A | 3/1994 | El-Antably et al. | |
| 7,402,932 B2* | 7/2008 | Applegate | H02K 21/14 310/112 |
| 7,579,744 B2 | 8/2009 | Kato | |
| 8,506,254 B2 | 8/2013 | Muller | |
| 2013/0015740 A1* | 1/2013 | Chamberlin | H02K 1/30 310/114 |
| 2015/0263575 A1* | 9/2015 | Pace | H02K 1/278 175/203 |
| 2017/0040870 A1* | 2/2017 | Ballauf | H02K 1/12 |

OTHER PUBLICATIONS

Extended European Search Report for EP Application No. 241685001.5, dated Oct. 14, 2024, pp. 1-8.

* cited by examiner

Primary Examiner — Alexander A Singh
Assistant Examiner — Charlie Frank Mann, Jr.
(74) Attorney, Agent, or Firm — CANTOR COLBURN LLP

(57) ABSTRACT

A rotor is provided. The rotor includes a central hub, an outer ring assembly and back-to-back curved webs. The outer ring assembly includes magnetic elements. The back-to-back curved webs are radially interposed between the central hub and the outer ring assembly. The back-to-back curved webs can be circumferentially continuous about the central hub or circumferentially non-continuous about the central hub.

16 Claims, 6 Drawing Sheets

LIGHTWEIGHT ROTOR DESIGN WITH COMPOSITE STRUCTURE

STATEMENT OF FEDERAL SUPPORT

This invention was made with Government support under Contract No. DE-AR0001352 awarded by the Department of Energy. The Government has certain rights in the invention.

BACKGROUND

The present disclosure relates to rotor designs and, in particular, to a lightweight rotor design with a composite structure.

An electric motor is an electric machine that converts electrical energy into mechanical energy. Most electric motors operate through the interaction between the motor's magnetic field and electric current in a wire winding to generate force in the form of torque applied on the motor's shaft. An electric generator is mechanically identical to an electric motor, but operates with a reversed flow of power, converting mechanical energy into electrical energy.

Typical electric motors have two mechanical parts and two electrical parts. The two mechanical parts are the rotor, which moves, and the stator, which does not. The two electrical parts include a set of magnets and an armature, one of which is attached to the rotor and the other to the stator, together forming a magnetic circuit.

SUMMARY

According to an aspect of the disclosure, a rotor is provided and includes a central hub, an outer ring assembly comprising magnetic elements and back-to-back curved webs radially interposed between the central hub and the outer ring assembly.

In accordance with additional or alternative embodiments, the back-to-back curved webs are circumferentially continuous about the central hub.

In accordance with additional or alternative embodiments, the back-to-back curved webs are circumferentially non-continuous about the central hub.

In accordance with additional or alternative embodiments, the central hub includes a hub flange and a carbon fiber inner ring including multiple layers of carbon fiber and epoxy with an interior surface to which the hub flange is adhered and an exterior surface adhered to an inner edge of each of the back-to-back curved webs, the magnetic elements include high-density magnets and the outer ring assembly further includes a carbon fiber outer ring, the carbon fiber outer ring including multiple layers of carbon fiber and epoxy with an interior surface adhered to an outer edge of each of the back-to-back curved webs and an exterior surface to which the high-density magnets are adhered and each of the back-to-back curved webs includes multiple layers of carbon fiber and epoxy.

In accordance with additional or alternative embodiments, each of the back-to-back curved webs has a concave curvature.

In accordance with additional or alternative embodiments, each of the back-to-back curved webs has a compound concave curvature.

In accordance with additional or alternative embodiments, each of the back-to-back curved webs exerts a radial spring force on at least one of the central hub and the outer ring assembly.

In accordance with additional or alternative embodiments, the back-to-back curved webs are joined at respective midpoints thereof.

In accordance with additional or alternative embodiments, space between the back-to-back curved webs is hollow.

According to an aspect of the disclosure, an electric motor is provided and includes a stator configured to generate magnetic flux and a rotor-shaft assembly disposed within a bore of the stator to be rotatable about a rotational axis and including a shaft and a rotor assembly. The rotor assembly includes a central hub configured to be tightly fit about the shaft, an outer ring assembly comprising magnetic elements and back-to-back curved webs radially interposed between the central hub and the outer ring assembly. The magnetic elements are configured to interact with the magnetic flux to drive unitary rotation of the rotor-shaft assembly.

In accordance with additional or alternative embodiments, the electric motor further includes a motor housing. The motor housing includes a narrow elongate end comprising bearings to rotatably support the shaft and a wide short end in which the stator and the rotor assembly are fit.

In accordance with additional or alternative embodiments, the back-to-back curved webs are circumferentially continuous about the central hub.

In accordance with additional or alternative embodiments, the back-to-back curved webs are circumferentially non-continuous about the central hub.

In accordance with additional or alternative embodiments, the central hub includes a hub flange for mating with the shaft and a carbon fiber inner ring including multiple layers of carbon fiber and epoxy with an interior surface to which the hub flange is adhered and an exterior surface adhered to an inner edge of each of the back-to-back curved webs, the magnetic elements include high-density magnets and the outer ring assembly further includes a carbon fiber outer ring, the carbon fiber outer ring including multiple layers of carbon fiber and epoxy with an interior surface adhered to an outer edge of each of the back-to-back curved webs and an exterior surface to which the high-density magnets are adhered and each of the back-to-back curved webs includes multiple layers of carbon fiber and epoxy.

In accordance with additional or alternative embodiments, each of the back-to-back curved webs has a concave curvature.

In accordance with additional or alternative embodiments, each of the back-to-back curved webs has a compound concave curvature.

In accordance with additional or alternative embodiments, each of the back-to-back curved webs exerts a radial spring force on at least one of the central hub and the outer ring assembly.

In accordance with additional or alternative embodiments, the back-to-back curved webs are joined at respective midpoints thereof.

In accordance with additional or alternative embodiments, space between the back-to-back curved webs is hollow.

According to an aspect of the disclosure, a method of assembling a rotor is provided and includes fabricating curved webs and inner and outer rings to each comprise multiple layers of carbon fiber and epoxy, forming a hub flange with the inner ring, assembling an outer ring assembly with magnetic elements, disposing the curved webs in a back-to-back concave configuration and adhering an inner edge of each of the curved webs to an exterior surface of the inner ring, the magnetic elements to an exterior surface of the outer ring and an outer edge of each of the curved webs to an interior surface of the outer ring.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Electro-mechanical motors often utilize a stator to drive a rotor that includes magnets held in place at an outer diameter of a large wheel element. In these and other cases, electro-mechanical motor designs can exhibit relatively high mass, insufficient stiffness and may fail to meet certain structural requirements, such as temperature and vibration. As such, a need remains for an electro-mechanical motor with reduced mass, improved stiffness, an ability to meet structural requirements, such as an ability to operate in various low-temperature and high-temperature environments and an ability to withstand vibration, and minimized supply chain complexity and cost.

Thus, as will be described below, a lightweight rotor design with a composite structure is provided. The lightweight rotor design with the composite structure can be developed through the utilization of topology optimization to create an optimized structure that connects magnet mass at an outer diameter of the rotor with an inner diameter at a hub. This structural connection can be simplified for fabrication with composite manufacturing techniques resulting in a construction that includes back-to-back webs with C-shaped cross-sections. These webs reduce complexity and increase rigidity and torque carrying capacity. The webs can be fabricated separately along with the inner and outer diameters, then assembled and processed as a composite structure forming a strong, lightweight rotor.

Figure 1:
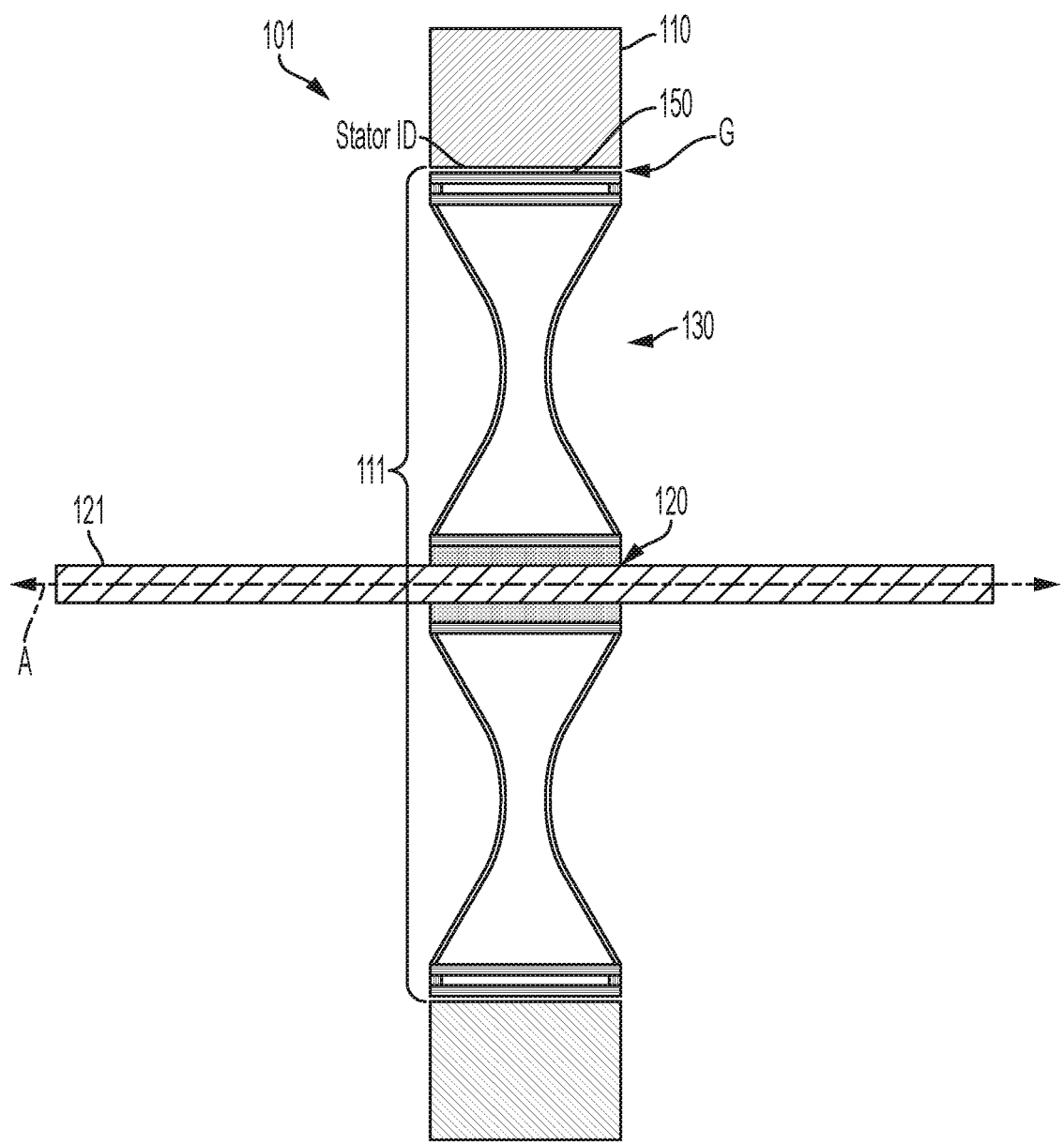
FIG. 1 is a side view of an electric motor including a lightweight rotor with a composite structure in accordance with embodiments.

With reference to FIG. 1, an electric motor 101 is provided and includes a stator 110 that is configured to generate magnetic flux and a rotor-shaft assembly 120. The rotor-shaft assembly 120 is disposed within a bore 111 of the stator 110 to be rotatable about a rotational axis A. The rotor-shaft assembly 120 includes a shaft 121 and a rotor assembly 130.

Figure 3:
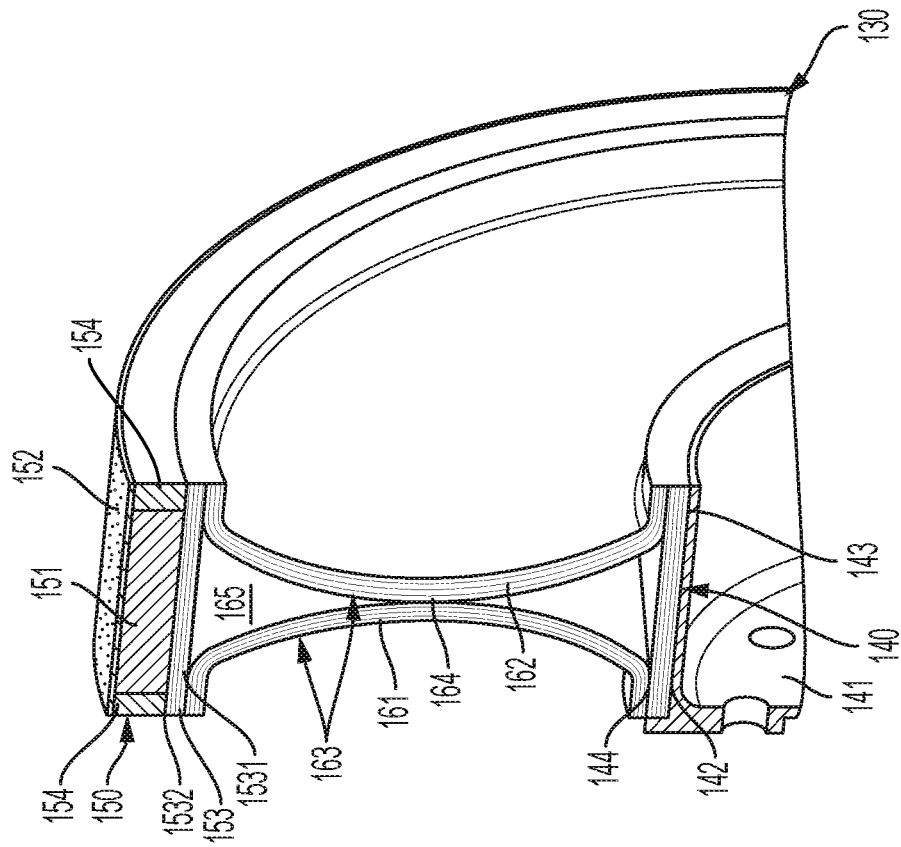
FIG. 3 is a cutaway perspective view of a portion of the lightweight rotor design with the composite structure and the continuous configuration of FIG. 2 in accordance with embodiments.
Figure 2:
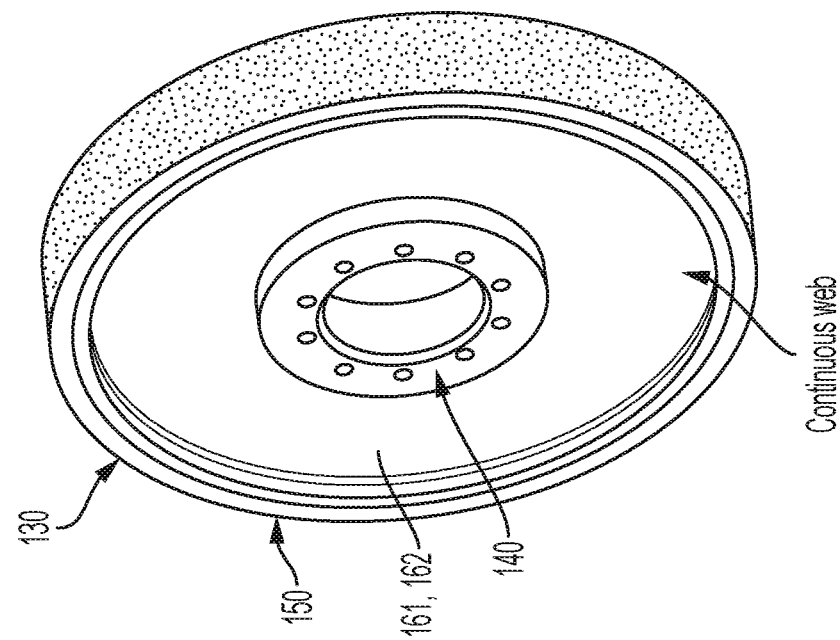
FIG. 2 is a perspective view of a lightweight rotor with a composite structure and a continuous configuration in accordance with embodiments.

With continued reference to FIG. 1 and with additional reference to FIGS. 2 and 3, the rotor assembly 130 includes a central hub 140, an outer ring assembly 150 and back-to-back curved webs 161, 162. The central hub 140 is configured to be tightly fit about the shaft 121 of FIG. 1. The outer ring assembly 150 includes magnetic elements 151. The back-to-back curved webs 161, 162 are radially interposed between the central hub 140 and the outer ring assembly 150 to form a unitary element. The magnetic elements 151 are configured to interact with the magnetic flux generated by the stator 110 to drive unitary rotation of the unitary element of the rotor assembly 130 and thus to drive unitary rotation of the rotor-shaft assembly 130 about the rotational axis A.

The central hub 140 includes a hub flange 141 for mating with and tightly fitting about the shaft 121 of FIG. 1 and an inner ring 142. The hub flange 141 can be provided with integrated features that facilitate the mating of the hub flange 141 with the shaft 121 within acceptable tolerances while providing sufficient strength. The inner ring 142 can be formed of multiple layers of carbon fiber and epoxy with an interior surface 143 to which the hub flange 141 is adhered and an exterior surface 144 that is adhered to an inner edge of each of the back-to-back curved webs 161, 162.

The magnetic elements 151 can include or be provided as high-density magnets that are placed at certain predefined intervals and magnetic orientations along the circumferential dimension. In addition to the magnetic elements 151, the outer ring assembly 150 further comprises an external outer ring 152, an outer ring 153 with an interior surface 1531 and an exterior surface 1532 and forward and aft end plates 154. The external outer ring 152, the outer ring 153 and the end plates 154 can each include multiple layers of carbon fiber and epoxy. The external outer ring 152 serves to constrain the magnetic elements 152 and can be sized to provide a pre-stress such that the outer diameter of the outer ring assembly 150 does not deflect beyond a design limit and maximum rotational speeds and maximum operational temperatures. This design limit can serve to maintain a gap G (see FIG. 1) between the outer diameter of the outer ring assembly 150 and an inner diameter of the stator 110 (see FIG. 1). The magnetic elements 151 can be adhered to the exterior surface 1532 of the outer ring 153 using a high-temperature epoxy to prevent relative movement between the magnetic elements 151. The forward and aft end plates 154 can be disposed and configured to provide shielding for magnetic flux or other electro-mechanical fields as well as to provide mechanical support to the magnetic elements 151 when they are under compression due to the external outer ring 152.

In accordance with embodiments, the forward and aft end plates 154 can include materials, such as Garolite G10 ™. In cases where operating temperatures of the electric motor 101 or the rotor assembly 130 would be expected to be up to about 150° C. or higher, other materials such as Bismaleimides (BMIs) can be used instead of Garolite G10 ™. The interior surface 1531 of the outer ring 153 can be adhered to an outer edge of each of the back-to-back curved webs 161, 162.

Each of the back-to-back curved webs 161, 162 can include multiple layers of carbon fiber and epoxy. Each of the back-to-back curved webs 161, 162 has a concave curvature (i.e., a C-shaped curve) 163. In some cases, the concave curvature 163 can be provided as a compound concave curvature in which a radius of curvature of each of the back-to-back curved webs 161, 162 changes along the radial dimension. In any case, the curvature of each of the back-to-back curved webs 161, 162 exerts a radial spring force on at least one of the central hub 140 and the outer ring assembly 150. This radial spring force can help to ensure that radial growth or contraction of the rotor assembly 130 as a whole is substantially uniform.

In accordance with further embodiments and as shown in FIG. 3, the back-to-back curved webs 161, 162 can be joined at respective mid-points 164 thereof. Also, as shown in FIG. 3, a space 165 that is defined between the back-to-back curved webs 161, 162 can be hollow or filled with a material that can provide additional structural stability, elasticity, an optimal weight distribution, etc.

Figure 5:
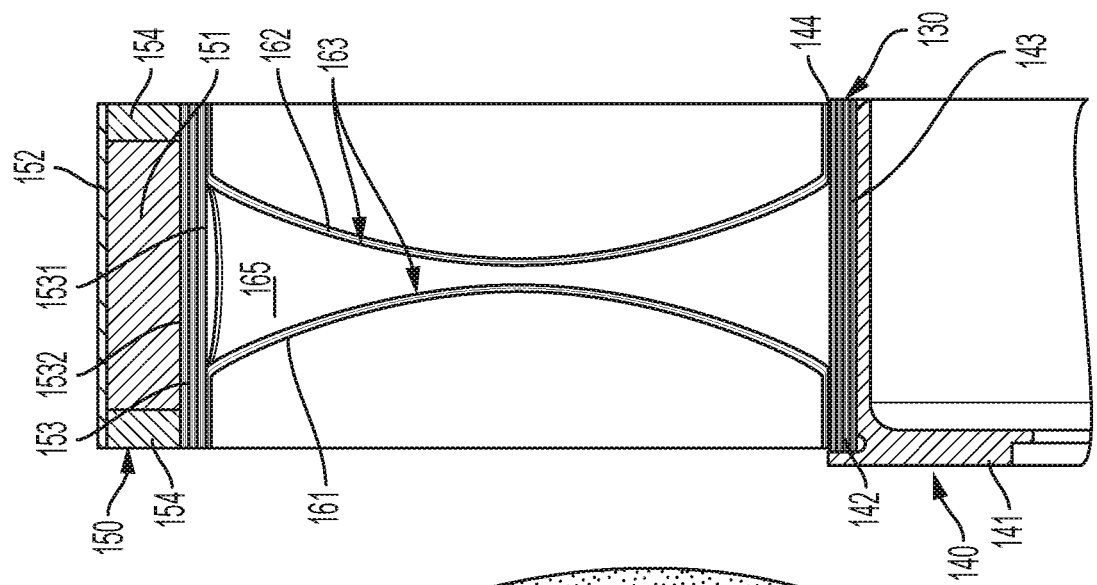
FIG. 5 is a cutaway perspective view of a portion of the lightweight rotor design with the composite structure and the spoke configuration of FIG. 4 in accordance with embodiments.
Figure 4:
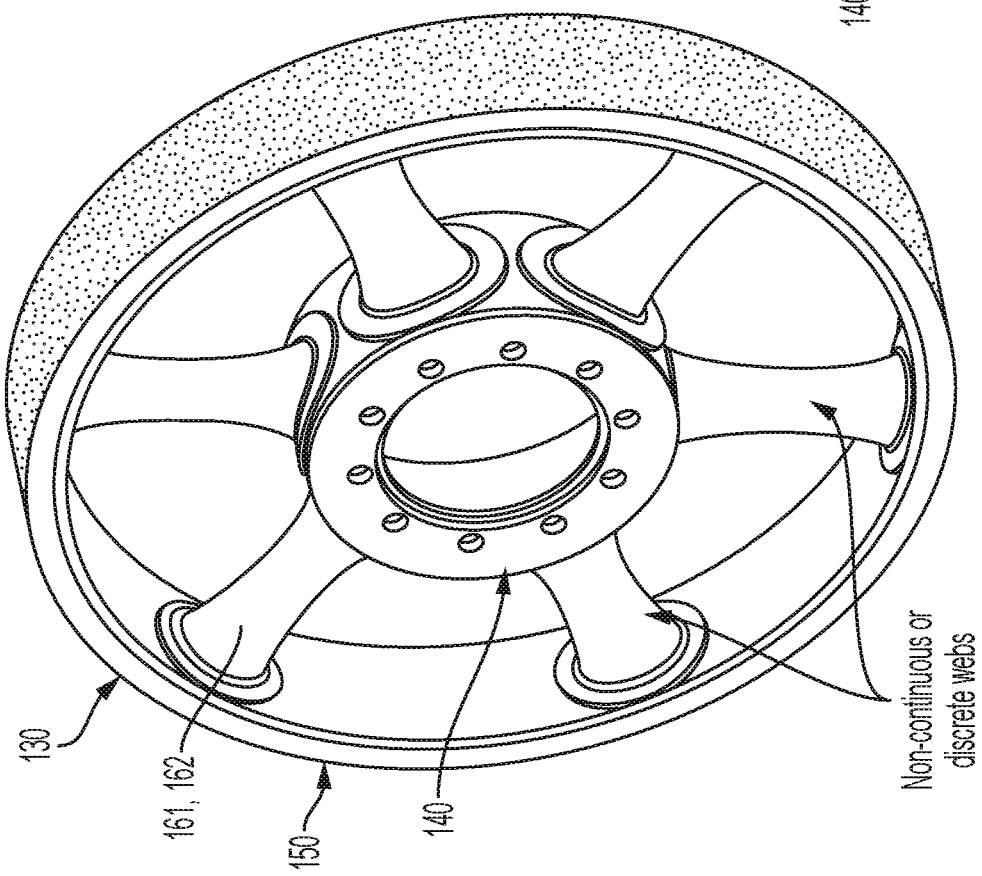
FIG. 4 is a perspective view of a lightweight rotor with a composite structure and a spoke configuration in accordance with embodiments.
Figure 6A:
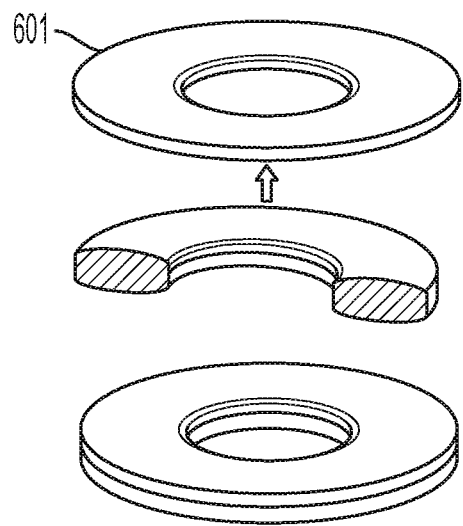
FIG. 6A is a perspective view illustrating a method of forming webs of a lightweight rotor with a composite structure in accordance with embodiments.
Figures 6B, 6C:
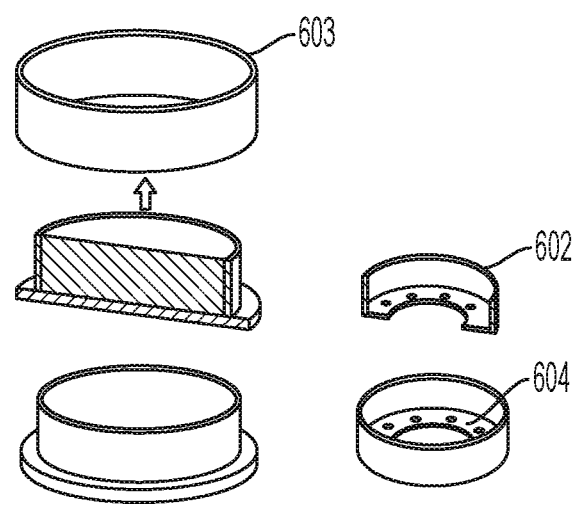
FIG. 6B is a perspective view illustrating a method of forming an outer ring of a lightweight rotor with a composite structure in accordance with embodiments.
FIG. 6C is a perspective view illustrating a hub formed within an inner ring of a lightweight rotor with a composite structure in accordance with embodiments.
Figure 6D:
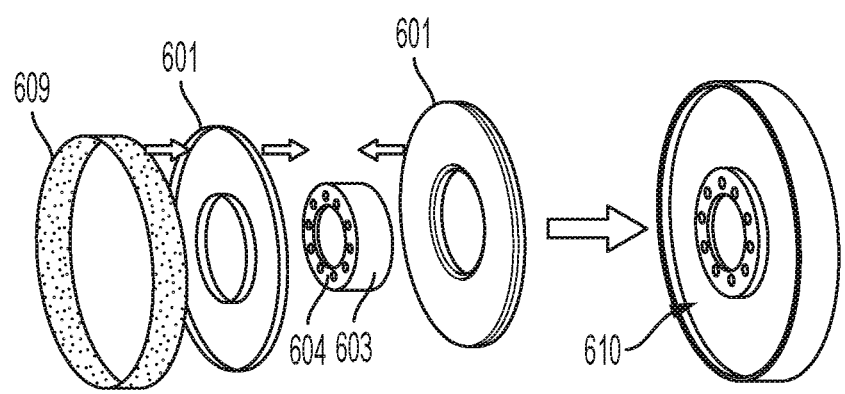
FIG. 6D is a perspective view illustrating an assembly of the webs, the outer ring and the inner ring and the hub of FIGS. 6A, 6B and 6C to form a first assembly in accordance with embodiments.
Figure 6E:
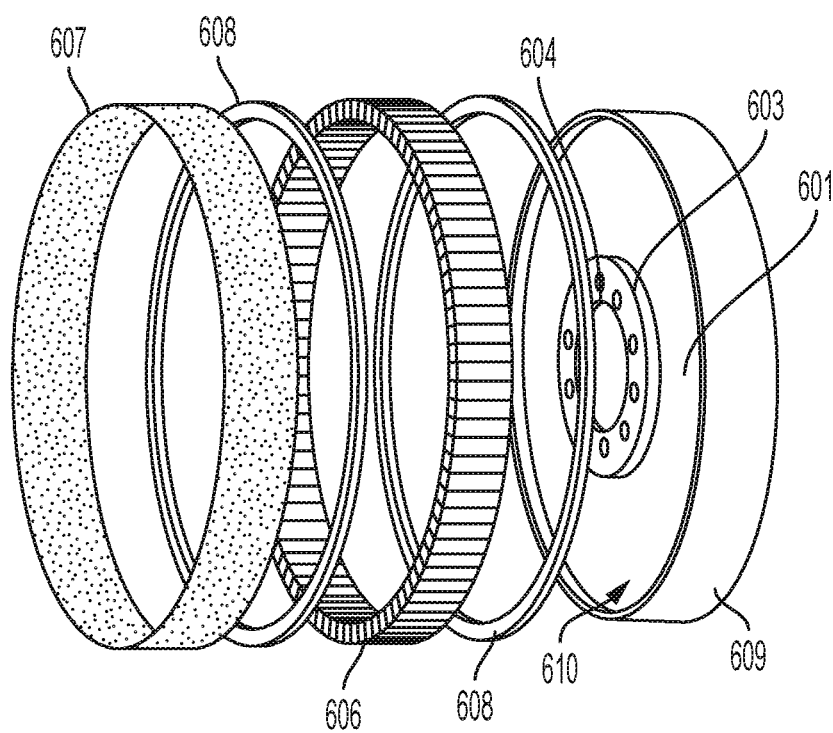
FIG. 6E is a perspective view illustrating an assembly of magnets, an outer ring and end plates with the first assembly of FIG. 6D in accordance with embodiments.

With continued reference to FIGS. 2 and 3 and with additional reference to FIGS. 4 and 5, the back-to-back curved webs 161, 162 can be circumferentially continuous about the central hub 140 (see FIGS. 2 and 3) or circumferentially non-continuous (i.e., discrete) about the central hub 140 (see FIGS. 4 and 5) to provide for airflow passages between forward and aft sides of the rotor assembly 130 and to improve heat dissipation. The various features of the rotor assembly 130 illustrated in FIGS. 4 and 5 are generally similar to those of FIGS. 2 and 3 and need not be redescribed herein.

With reference to FIGS. 6A-6E, a method of assembling a rotor to form a rotor assembly, such as the rotor assembly 130 described above, is provided. The method includes fabricating curved webs 601 and inner and outer rings 602 and 603 to each include multiple layers of carbon fiber and epoxy and forming a hub flange 604 with the inner ring 602 (see FIGS. 6A, 6B and 6C). The method further includes assembling an outer ring assembly 605 with magnetic elements 606 that are surrounded by an external outer ring 607, forward and aft end plates 608 and an outer ring 609 (see FIG. 6E), disposing the curved webs 601 in a back-to-back concave configuration 610 (see FIG. 6D) and adhering an inner edge of each of the curved webs 601 to an exterior surface of the inner ring 602, the magnetic elements 606 to an exterior surface of the outer ring 609 and an outer edge of each of the curved webs 601 to an interior surface of the outer ring 609 (see FIGS. 6D and 6E). In addition, the method can include tightly fitting the hub flange 604 about a shaft, such as the shaft 121 of FIG. 1, to form a rotor assembly, such as the rotor assembly 130, and installing the rotor assembly 130 within a bore of a stator, such as the stator 110 of FIG. 1, whereby the magnetic elements 606 are interactable with magnetic flux generated by the stator 110 to drive rotation of the rotor assembly 130 about a rotational axis, such as the rotational axis A of FIG. 1.

Figure 7B:
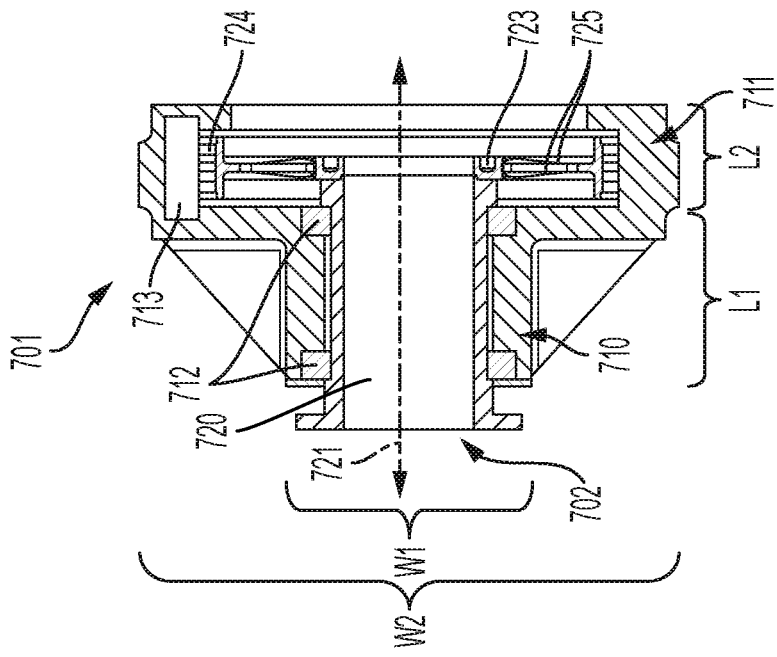
FIG. 7B is a side view of the motor housing of FIG. 7A in accordance with embodiments.
Figure 7A:
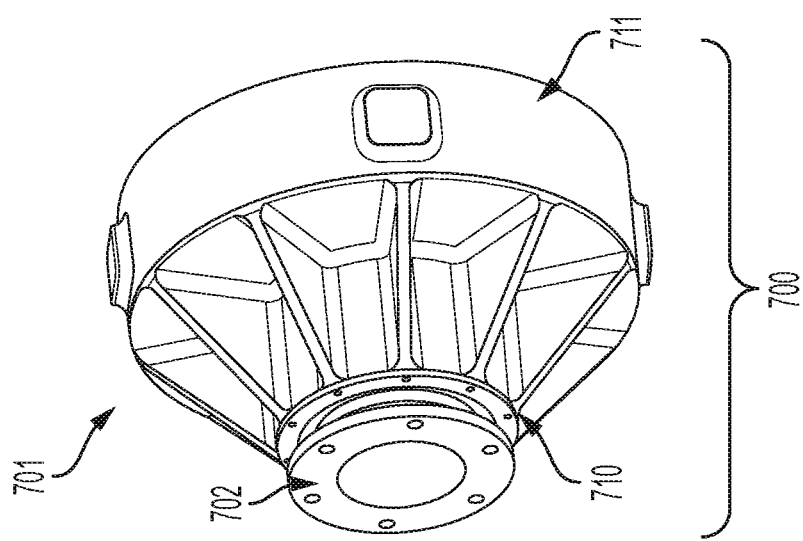
FIG. 7A is a perspective view of a motor housing with an integrated rotor in accordance with embodiments.

With reference to FIGS. 7A and 7B, an electric motor 700 includes a motor housing 701 with an integrated rotor 702. The integrated rotor 702 can be provided with the rotor-shaft assembly 120 of FIG. 1 and the rotor assembly 130 of FIGS. 2 and 3 or the rotor assembly 130 of FIGS. 4 and 5. As shown in FIGS. 7A and 7B, the motor housing 701 is provided as a housing with a narrow elongate end 710 and a wide short end 711, bearings 712 disposed in the narrow elongate end 710 and a stator 713 in the wide short end 711. The narrow elongate end 710 has an axial length L1 and the wide short end 711 has an axial length L2, which is shorter than the axial length L1. The narrow elongate end 701 has a radial width W1 and the wide short end 711 has a radial width W2, which is wider than the radial width W1.

The integrated rotor 702 includes a shaft 720 that is rotatably supported by the bearings 712 to rotate about rotational axis 721 (see FIG. 7B) and a rotor assembly 722. The rotor assembly 722 is housed in the wide short end 711 and configured to fit therein. The shaft 720 has a length that can exceed the axial length L1 of the narrow elongate end 710. The rotor assembly 722 has an axial length that is narrower than the axial length L2 of the wide short end 711 and a radial width that exceeds the radial width W1 of the narrow elongate end 710 and is less than the radial width W2 of the wide short end 711.

The rotor assembly 722 includes a central hub 723, an outer ring assembly 724 and back-to-back curved webs 725 as described above. Magnetic elements within the outer ring assembly 724 are configured to interact with the magnetic flux generated by the stator 713 to drive unitary rotation of the rotor assembly 722 and thus to drive unitary rotation of the integrated rotor 702 about the rotational axis 721.

Technical effects and benefits of the present disclosure are the provision of a lightweight rotor design with a composite structure that provides several advantages. The composite construction provides for weight reduction and improved mechanical stiffness over traditional metallic materials. This is particularly true for cases in which electric motors turn at high rotational speeds and require significant stiffness to prevent rotor-dynamic modes within the operating range. The reduction in weight or mass improves a ratio of power and torque to mass for the rotor, which further improves system efficiency and enables system integration. Carbon composites used in the rotor design have a low linear thermal expansion rate as compared to metallic materials and provide dimensional stability to the rotor design at high temperatures and rotational speed. Also, numerous composite materials options are available for differing temperature and cost requirements.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A rotor, comprising:
   a central hub;
   an outer ring assembly comprising magnetic elements; and
   back-to-back curved webs radially interposed between the central hub and the outer ring assembly,
   wherein the back-to-back curved webs are circumferentially continuous about the central hub.

2. The rotor according to claim 1, wherein:
   the central hub comprises a hub flange and a carbon fiber inner ring comprising multiple layers of carbon fiber and epoxy with an interior surface to which the hub flange is adhered and an exterior surface adhered to an inner edge of each of the back-to-back curved webs,
   the magnetic elements comprise high-density magnets and the outer ring assembly further comprises a carbon fiber outer ring, the carbon fiber outer ring comprising multiple layers of carbon fiber and epoxy with an interior surface adhered to an outer edge of each of the back-to-back curved webs and an exterior surface to which the high-density magnets are adhered, and
   each of the back-to-back curved webs comprises multiple layers of carbon fiber and epoxy.

3. The rotor according to claim 1, wherein each of the back-to-back curved webs has a concave curvature.

4. The rotor according to claim 1, wherein each of the back-to-back curved webs has a compound concave curvature.

5. The rotor according to claim 1, wherein each of the back-to-back curved webs exerts a radial spring force on at least one of the central hub and the outer ring assembly.

6. The rotor according to claim 1, wherein the back-to-back curved webs are joined at respective mid-points thereof.

7. The rotor according to claim 1, wherein space between the back-to-back curved webs is hollow.

8. An electric motor, comprising:
   a stator configured to generate magnetic flux; and
   a rotor-shaft assembly disposed within a bore of the stator to be rotatable about a rotational axis and comprising a shaft and a rotor assembly, the rotor assembly comprising:
      a central hub configured to be tightly fit about the shaft;
      an outer ring assembly comprising magnetic elements; and
      back-to-back curved webs radially interposed between the central hub and the outer ring assembly,
      the magnetic elements being configured to interact with the magnetic flux to drive unitary rotation of the rotor-shaft assembly,
      wherein the back-to-back curved webs are circumferentially continuous about the central hub.

9. The electric motor according to claim 8, further comprising a motor housing, the motor housing comprising:
   a narrow elongate end comprising bearings to rotatably support the shaft; and
   a wide short end in which the stator and the rotor assembly are fit.

10. The electric motor according to claim 8, wherein:
    the central hub comprises a hub flange for mating with the shaft and a carbon fiber inner ring comprising multiple layers of carbon fiber and epoxy with an interior surface to which the hub flange is adhered and an exterior surface adhered to an inner edge of each of the back-to-back curved webs,
    the magnetic elements comprise high-density magnets and the outer ring assembly further comprises a carbon fiber outer ring, the carbon fiber outer ring comprising multiple layers of carbon fiber and epoxy with an interior surface adhered to an outer edge of each of the back-to-back curved webs and an exterior surface to which the high-density magnets are adhered, and
    each of the back-to-back curved webs comprises multiple layers of carbon fiber and epoxy.

11. The electric motor according to claim 8, wherein each of the back-to-back curved webs has a concave curvature.

12. The electric motor according to claim 8, wherein each of the back-to-back curved webs has a compound concave curvature.

13. The electric motor according to claim 8, wherein each of the back-to-back curved webs exerts a radial spring force on at least one of the central hub and the outer ring assembly.

14. The electric motor according to claim 8, wherein the back-to-back curved webs are joined at respective mid-points thereof.

15. The electric motor according to claim 8, wherein space between the back-to-back curved webs is hollow.

16. A method of assembling a rotor, the method comprising:
    fabricating curved webs and inner and outer rings to each comprise multiple layers of carbon fiber and epoxy;
    forming a hub flange with the inner ring;
    assembling an outer ring assembly with magnetic elements;
    disposing the curved webs in a back-to-back concave configuration; and
    adhering an inner edge of each of the curved webs to an exterior surface of the inner ring, the magnetic elements to an exterior surface of the outer ring and an outer edge of each of the curved webs to an interior surface of the outer ring,
    wherein the fabricating of the back-to-back curved webs is executed such that the back-to- back curved webs are circumferentially continuous about the inner ring.

* * * * *